US010549783B2

United States Patent
Haselhorst et al.

(10) Patent No.: US 10,549,783 B2
(45) Date of Patent: Feb. 4, 2020

(54) AUXILIARY FRAME FOR A VEHICLE, IN PARTICULAR AN ELECTRIC VEHICLE

(71) Applicant: Autotech Engineering Deutschland GmbH, Bielefeld (DE)

(72) Inventors: Kai Haselhorst, Versmold (DE); Viktor Friesen, Bielefeld (DE); Ulf Sudowe, Georgsmarienhuette (DE); Oliver Frenzel, Sassenberg (DE)

(73) Assignee: Autotech Engineering Deutschland GmbH, Bielefeld (DE)

( * ) Notice: Subject to any disclaimer, the term of this patent is extended or adjusted under 35 U.S.C. 154(b) by 58 days.

(21) Appl. No.: 16/029,991

(22) Filed: Jul. 9, 2018

(65) Prior Publication Data

US 2019/0023322 A1   Jan. 24, 2019

(30) Foreign Application Priority Data

Jul. 24, 2017 (EP) ..................................... 17182810

(51) Int. Cl.
  *B62D 21/11*   (2006.01)
(52) U.S. Cl.
  CPC ................................. *B62D 21/11* (2013.01)
(58) Field of Classification Search
  CPC ..................................................... B62D 21/11
  USPC ................................................. 280/124.109
  See application file for complete search history.

(56) References Cited

U.S. PATENT DOCUMENTS

| | | | | |
|---|---|---|---|---|
| 4,989,894 A | * | 2/1991 | Winsor | B60G 3/22 |
| | | | | 280/124.109 |
| 2006/0078463 A1 | | 4/2006 | Shea et al. | |
| 2013/0241186 A1 | | 9/2013 | Shibaya | |
| 2014/0145472 A1 | * | 5/2014 | Tsuchiya | B62D 21/02 |
| | | | | 296/204 |
| 2014/0368000 A1 | * | 12/2014 | Komiya | B62D 21/11 |
| | | | | 296/193.07 |
| 2015/0217808 A1 | * | 8/2015 | Haselhorst | B62D 21/11 |
| | | | | 280/124.109 |
| 2016/0052564 A1 | | 2/2016 | Graefe et al. | |
| 2017/0120953 A1 | * | 5/2017 | Tomikuda | B62D 21/11 |

FOREIGN PATENT DOCUMENTS

| | | |
|---|---|---|
| DE | 102013004804 A1 | 9/2013 |
| DE | 102012021562 A1 | 5/2014 |
| DE | 102012111461 A1 | 5/2014 |
| EP | 1591349 A1 | 11/2005 |
| EP | 1733951 A1 | 12/2006 |
| EP | 2990308 A1 | 3/2016 |

* cited by examiner

*Primary Examiner* — Toan C To
(74) *Attorney, Agent, or Firm* — The Webb Law Firm

(57) ABSTRACT

An auxiliary frame for a vehicle including a first shell element and a second shell element, rigidly connected to the first shell element, to define a cavity. The auxiliary frame includes a cross bridge for bearing a vehicle drive unit. The cross bridge is connected by a screwed connection to the first shell element and/or to the second shell element. The auxiliary frame includes a sleeve-like spacer element for the inserting of a screw for vehicle body connection. The spacer element is arranged at one of its ends at a through-hole of the first shell element and extends within the cavity in the direction of a through-hole of the second shell element. The spacer element has a sleeve-like portion for receiving a screw of the screwed connection of the cross bridge.

18 Claims, 4 Drawing Sheets

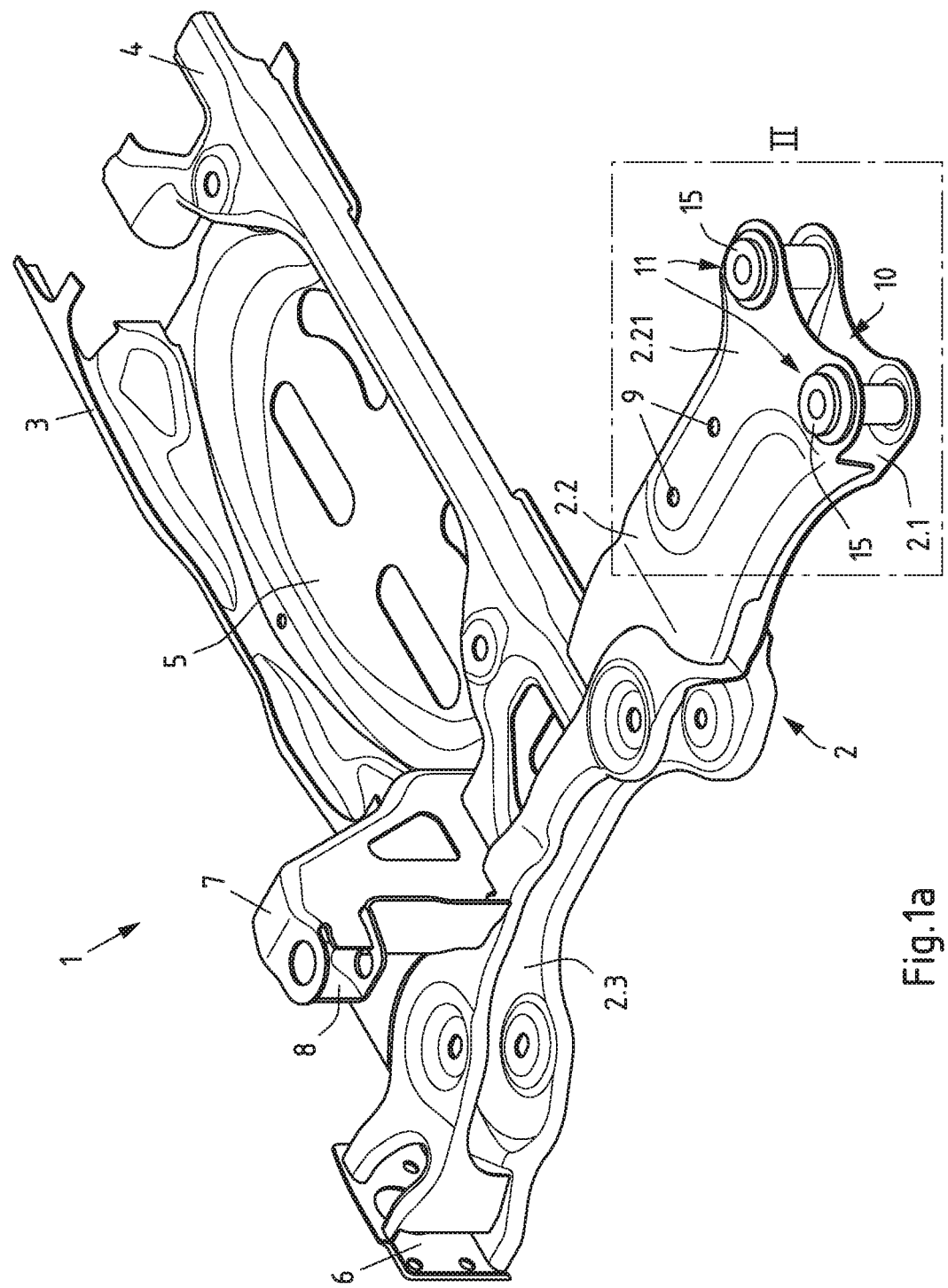

AUXILIARY FRAME FOR A VEHICLE, IN PARTICULAR AN ELECTRIC VEHICLE

CROSS-REFERENCE TO RELATED APPLICATION

This application claims priority to European Patent Application No. 17182810.6 filed Jul. 24, 2017, the disclosure of which is hereby incorporated in its entirety by reference.

BACKGROUND OF THE INVENTION

Field of the Invention

The invention relates to an auxiliary frame, in particular a front axle auxiliary frame, for a vehicle, in particular an electric vehicle, with a first shell element and with a second shell element which is rigidly connected to the first shell element and, with the latter, defines a cavity.

Description of Related Art

Such auxiliary frames, also designated as axle carriers, are known in a variety of embodiments (see e.g. DE 10 2012 021 562 A1 and DE 10 2012 111 461 A1). They are to be as light as possible, with high stability and rigidity, and usually have control arm connections (bearing mounts) for wheel guide elements and other units, in order to enable, as a pre-assembly unit, the installation of complete front or rear axle modules with drive units.

Electric motors of electric vehicles can already emit their maximum torque when the vehicle is at a standstill and therefore, unlike a vehicle drive with an internal combustion engine, they generally do not require a manual gearbox. The high starting torques of electric vehicles require auxiliary frame constructions of particularly stable design, to which the electric motors are fastened for example by means of a cross bridge. This is because if, as in conventional auxiliary frames for vehicles with an internal combustion engine, sheet metal shell elements of the auxiliary frame, for example upper shells, were installed with conventional sheet metal thicknesses of e.g. approximately 2.2 mm, the failure of the auxiliary frame would occur owing to bending stresses which are too great in the region of the cross bridge connection. In order to rule out such a component failure, it is known from practice to increase the sheet metal thickness of the sheet metal shells, in particular the upper shells. However, the thereby increased use of material leads to a considerable increase in weight of the auxiliary frame.

Owing to the relatively low energy density which a rechargeable traction battery (accumulator) offers compared to a tank filled with fuel, electric vehicles are generally distinctly heavier than corresponding vehicles with an internal combustion engine. High vehicle weights produce high effective and dynamic axle loads, which in turn lead to an increased chassis wear.

SUMMARY OF THE INVENTION

The present invention is based on the problem of creating an auxiliary frame of the type named in the introduction, which with unchanged or only slightly increased weight has a distinctly higher stability, for example a higher bending strength.

The auxiliary frame according to the invention is composed of shell elements. It includes a first shell element and a second shell element, which is rigidly connected to the first shell element and, with it, defines a cavity. Furthermore, the auxiliary frame includes a cross bridge for bearing a vehicle drive unit, for example a vehicle drive motor, such as an electric motor, or a gear unit. The cross bridge is connected by a screwed connection to the first shell element and/or to the second shell element. In addition, the auxiliary frame is provided with a sleeve-like spacer element for the inserting of a screw for connecting to the vehicle body. The spacer element is arranged at one of its ends at a through-hole of the first shell element and extends within the cavity in the direction of a through-hole of the second shell element. The spacer element has a sleeve-like portion for receiving a screw of the screwed connection of the cross bridge.

The spacer element according to the invention constitutes a reinforcement of the auxiliary frame. It can therefore also be designated as a reinforcing element. The spacer element (reinforcing element) according to the invention defines a shared load path of at least one drive unit cross bridge mount to at least one vehicle body connection of the auxiliary frame. Hereby, the drive unit cross bridge mount and the vehicle body connection are connected to one another, whereby the auxiliary frame is reinforced in the region of the cross bridge connection and the bending stress occurring there is reduced.

The auxiliary frame according to the invention is therefore distinguished, with unchanged or only slightly increased weight, by a distinctly higher bending strength in the region of the cross bridge connection.

The shell elements of the auxiliary frame may be made of sheet metal, for example sheet steel. Sheet metal, for example sheet steel, offers strength properties at relatively low material costs. It can be shaped into complex geometries and is also readily able to be cut and welded. The first shell element and/or the second shell element of the auxiliary frame can be produced from higher-strength or press-hardenable sheet steel, for example from manganese-boron steel. Such sheet steel is distinguished, with low weight, by high bending strength and tensile strength.

The first shell element and the second shell element of the auxiliary frame have a different sheet metal thickness. The shell element directly receiving (carrying) the cross bridge has, for example, a smaller sheet metal thickness than the other shell element which is rigidly connected therewith.

A further embodiment of the invention makes provision that the spacer element has a web-shaped portion, which connects a sleeve-like portion of the spacer element for the inserting of a screw for vehicle body connection with the sleeve-like portion for receiving a screw of the screwed connection of the cross bridge. The web-shaped portion is arranged relative to the sleeve-like portions such that the respective sleeve-like portion projects on both sides with respect to the two side faces of the web-shaped portion, which run parallel to a screw receiver axis of the respective sleeve-like portion. Through this embodiment, a load carrying capacity can be achieved in the region of the cross bridge connection with a low weight of the spacer element (reinforcing element). In this respect, a further embodiment of the spacer element makes provision that its web-shaped portion has a thickness, measured perpendicularly to the two side faces, in the range of 3 to 10 mm, for example in the range of 4 to 8 mm.

A further embodiment of the invention is characterized in that the spacer element is configured at least partially in a loop shape. Hereby, a shared load path of at least one drive unit cross bridge mount to at least one vehicle body connection of the auxiliary frame can be reliably realized in a simple manner. The loop-shaped portions of the spacer element define at least two closed loops, which have the function of spacer sleeves.

With regard to low material costs and manufacturing costs, the spacer element according to the invention may be produced from a single metal sheet, for example from a single steel sheet. For this, an embodiment of the spacer element makes provision for example that two loop ends of the spacer element are welded to one another in a butt joint. In this case, the manufacturing costs of the spacer element are relatively small, because only one single weld seam has to be produced at the butt joint.

Another embodiment of the spacer element is characterized in that two loop ends of the spacer element are at a distance from one another and welded in a lap joint to the web-shaped portion. In this case, two weld seams, for example fillet seam weld seams, must in fact be produced, however on the other hand a saving is made with regard to sheet metal material in the region of the web-shaped portion. This is because the two loop ends of the spacer element, produced from a single metal sheet, delimit a recess on its web-shaped portion. This recess or respectively saving on material reduces the weight of the spacer element.

The sheet steel from which the spacer element is produced, for example in the form of a single-shell sheet metal embodiment, has a strength, for example tensile strength, of at least 300 MPa, particularly preferably at least 480 MPa.

Another embodiment of the spacer element is characterized in that the spacer element is embodied in a single piece as a metallic casting or forging. Also in this case, the material of the spacer element has a strength, for example tensile strength, of at least 300 MPa. The embodiment of the spacer element as a one-piece metallic casting or forging has the advantage that the weight of the spacer element can be further reduced, because in this case no two-layered sheet metal arrangement is necessary in the region of the web-shaped portion of the spacer element. Moreover, in this case the production of weld seams for manufacturing the spacer element is dispensed with. Furthermore, the embodiment of the spacer element as a one-piece metallic casting or forging has the advantage that the sleeve-like portions of the spacer element with circular-cylindrical recesses can be manufactured with high dimensional accuracy of the internal diameter of the respective circular-cylindrical recess.

A further embodiment of the invention is characterized in that the spacer element has at least two sleeve-like portions for the inserting of at least two screws for vehicle body connection. Hereby, the load bearing capacity of the spacer element can be further increased, and the bending stress occurring in the region of the cross bridge connection can be further reduced. Alternatively or additionally to this embodiment, the spacer element can also have at least two sleeve-like portions for receiving at least two screws of the screwed connection of the cross bridge. Hereby, also, the load bearing capacity of the spacer element can be increased, and the bending stress occurring in the region of the cross bridge connection can be further reduced. The spacer element or respectively the web-shaped portion connecting the sleeve-shaped portions is configured so as to be star-shaped in these embodiments.

The screw diameters necessary at the cross bridge connection and at the vehicle body connection of the auxiliary frame can be of different size, in order to enable different screw tightening torques. Accordingly, a further embodiment of the auxiliary frame according to the invention makes provision that the sleeve-like portion has a receiving cross-sectional area for receiving a screw of the screwed connection of the cross bridge, which area is smaller than the receiving cross-sectional area of the sleeve-like portion of the spacer element, which serves for the inserting of a screw for vehicle body connection.

According to a further embodiment of the auxiliary frame, a shoulder for receiving the spacer element is formed into the first shell element and/or into the second shell element. The formed-in shoulder facilitates the accurately fitting arrangement of the spacer element with respect to the through-holes for receiving the said screws. In addition, the formed-in shoulder improves the bending stabilization of the respective shell element in the region of the cross bridge connection.

BRIEF DESCRIPTION OF THE DRAWINGS

The invention is explained in further detail below with the aid of drawings illustrating several example embodiments. There are shown:

FIGS. 1a and 1b a portion of an auxiliary frame for a vehicle, in particular an electric vehicle, without and with a cross bridge connected to an upper shell of the auxiliary frame, in a perspective illustration;

DESCRIPTION OF THE INVENTION

Figure 1B:
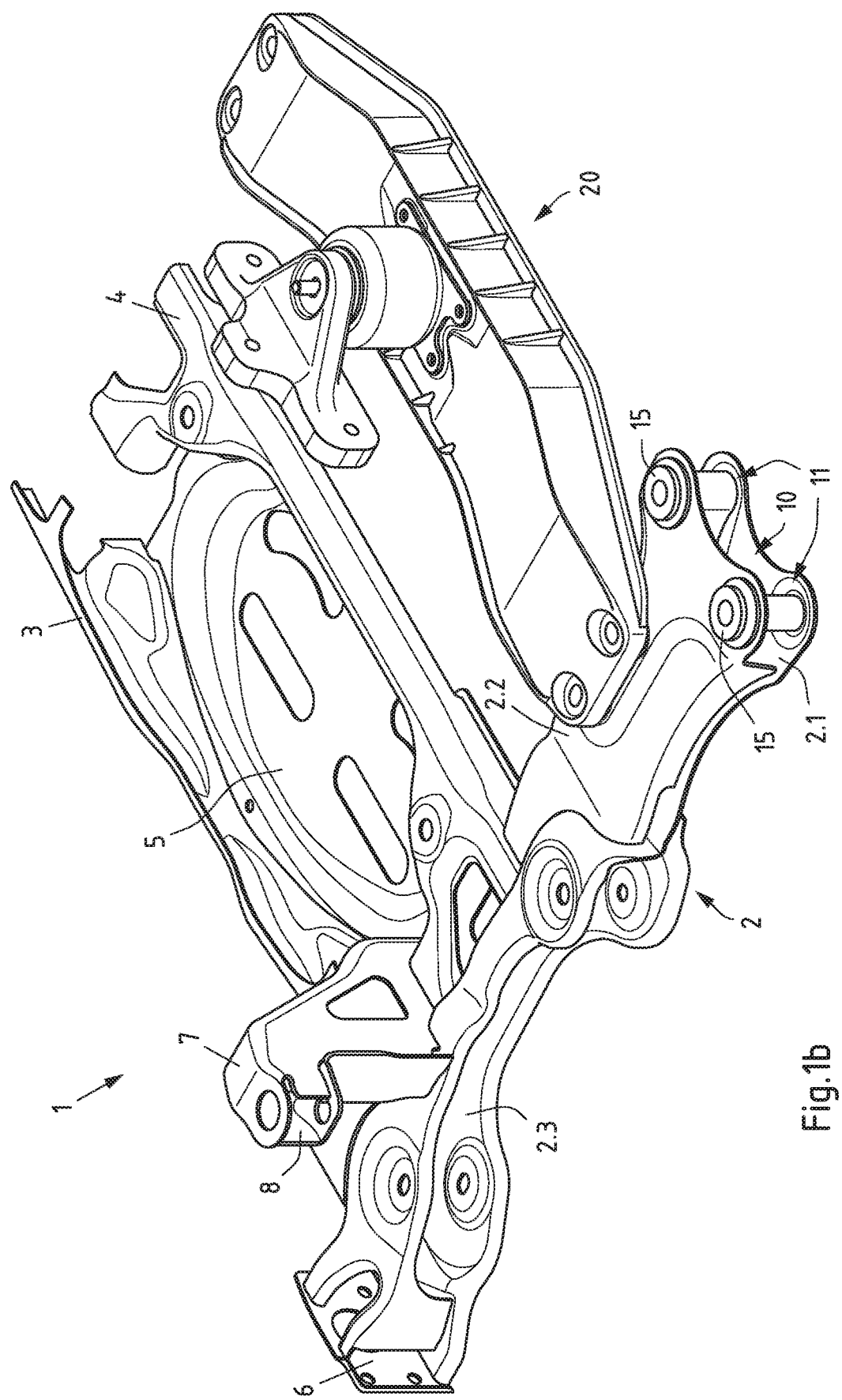

In FIG. 1a and FIG. 1b a portion of an auxiliary frame 1 for a motor vehicle, in particular an electric vehicle, is shown. The auxiliary frame 1, which is embodied here for example as a front axle auxiliary frame, is assembled from longitudinal beams and transverse beams. The term "longitudinal beam" is understood to mean here support elements or portions of support elements of the auxiliary frame which in the mounted state of the auxiliary frame 1 extend substantially along the longitudinal axis of the respective motor vehicle. The transverse beams, on the other hand, extend in the mounted state of the auxiliary frame 1 substantially horizontally and transversely to the longitudinal axis of the motor vehicle.

The longitudinal beams and transverse beams are formed from sheet metal shells. In FIG. 1a and FIG. 1b, the left front longitudinal beam 2, a front transverse beam 3 and an upper shell 4, serving as transverse beam, are shown. Furthermore, a metal sheet 5 serving as steering protection, a crash absorber connecting sheet 6 and so-called tower shells 7, 8, which serve for connecting the auxiliary frame 1 to the vehicle body, can be seen. In addition, the auxiliary frame 1 is provided with at least one cross bridge 20, which is fastened to the longitudinal beams 2 by means of screwed connections. The cross bridge 20 serves for bearing a vehicle drive unit, for example of an electric motor. Alternatively, however, an internal combustion engine or a gear unit can be mounted on the cross bridge 20.

The connection of the at least one cross bridge 20 with the longitudinal beams 2 takes place for example at the mounts 9, shown in FIGS. 1a and 1b, which have through-holes for receiving screws. The respective longitudinal beam 2 of the auxiliary frame 1 has a first shell element 2.1 and a second shell element 2.2, which is rigidly connected to the first shell element 2.1 and, with the latter, defines a cavity 10. The shell element 2.1 can also be designated as main shell, and the shell element 2.2 as upper shell. In addition, the longitudinal beam 2 can have at least one further shell element 2.3, for example a lower shell. The shell elements 2.1, 2.2, 2.3 are preferably made from sheet steel and preferably have different sheet thicknesses and/or different material characteristics, in particular yield strengths and tensile strengths. Thus, for example, the shell element (upper shell) 2.2 can have a smaller sheet thickness than the shell element (main shell) 2.1.

Adjacent to the through-holes 9, which serve for receiving screws for connecting the cross bridge 20 to the longitudinal beam, at least one or preferably two connecting elements 11 are arranged for connecting the auxiliary frame 1 to the vehicle body.

The connection (mount) of the cross bridge 20 onto the longitudinal beam 2 and the connecting elements 11 for connecting the auxiliary frame 1 to the vehicle body is embodied by means of one or more spacer elements 12, 13, 14. In the example embodiment illustrated in FIGS. 1a, 1b and 2, the spacer elements 12, 13 are embodied in the form of cylindrical spacer sleeves and in the form of a sleeve-like spacer element 14. The connecting elements 11 are provided with washers 15, preferably toothed washers. The sleeve-like spacer element 14 comprises a first sleeve-like portion 14.1 for inserting, i.e. for receiving a screw for vehicle body connection, and a second sleeve-like portion 14.2 for receiving a screw of the screwed connection of the cross bridge 20. It is arranged here at one of its ends at a through-hole of the first shell element 2.1 and extends within the cavity 10, delimited by the shell elements 2.1, 2.2, in the direction of a through-hole 9 of the second shell element 2.2.

The sleeve-like spacer element 14 acts as reinforcing element. It defines a shared load path of a cross bridge mount 9 to a body connection 11. The cross bridge mount 9 and the body connection 11 are therefore directly connected to one another by the spacer element 14.

For this purpose the spacer element 14 has preferably a web-shaped portion 14.3, which connects the sleeve-like portion 14.1 for the inserting of a screw for vehicle body connection with the sleeve-like portion 14.2 for receiving a screw of the screwed connection of the cross bridge 20. The web-shaped portion 14.3 is arranged with respect to the sleeve-like portions 14.1, 14.2 such that the respective sleeve-like portion 14.1, 14.2 projects on both sides with respect to both side faces 14.31, 14.32 of the web-shaped portion 14.3, which run substantially parallel to a screw receiver axis of the respective sleeve-like portion 14.1, 14.2. The thickness d of the web-shaped portion 14.3, measured perpendicularly to its two side faces 14.31, 14.32, lies for example in the range of 4 to 8 mm.

Figure 2:
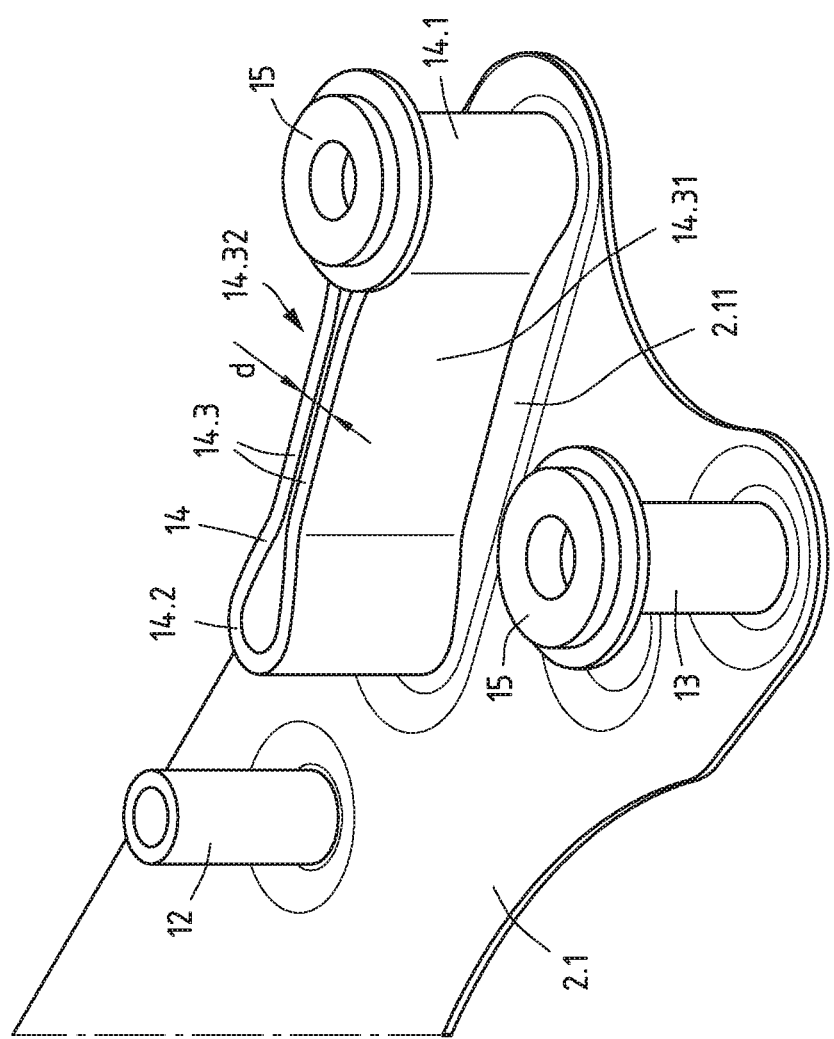
FIG. 2 a portion of the auxiliary frame according to portion II in FIGS. 1a and 1b, without upper shell, with a view onto a spacer element according to the invention, in perspective illustration.

In FIGS. 1a, 1b and 2, it can be seen in addition that a shoulder 2.11, 2.11 for receiving the spacer element 14 is formed into the first shell element 2.1 and into the second shell element 2.2 of the longitudinal beam 2.

The sleeve-like spacer element 14 can be embodied in various ways. In the example embodiment shown in FIG. 2, the spacer element 14 is configured in a loop shape. The portions 14.1, 14.2 of the spacer element define two closed loops, which have the function of spacer sleeves. The spacer element 14 is preferably single-shelled, i.e. is produced from a single metal sheet. The sheet metal material is preferably higher-strength sheet steel, which has for example a tensile strength in the range of 480 to 620 MPa and a minimum yield strength of 420 MPa.

Figure 3:
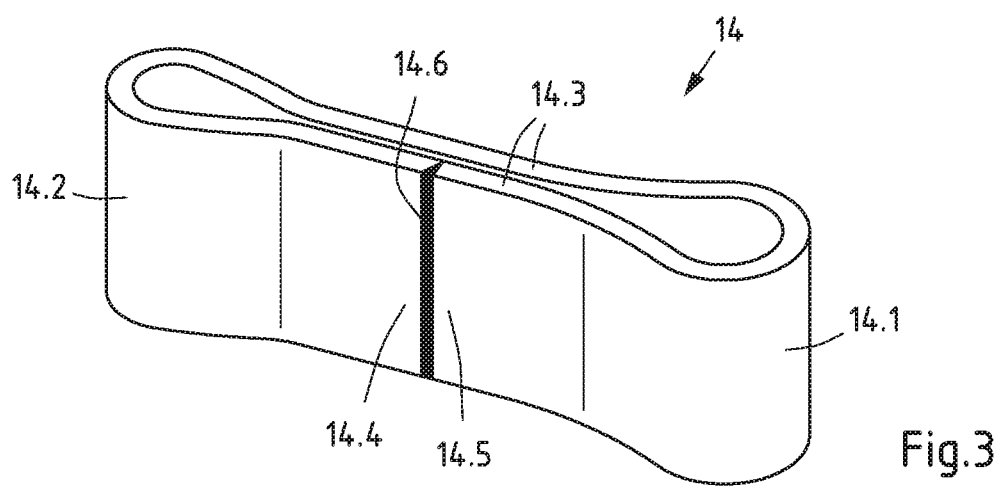
FIGS. 3 to 5 various example embodiments of the spacer element according to the invention, respectively in perspective illustration.

In the example embodiment illustrated in FIG. 3, the two loop ends 14.4, 14.5 of the spacer element 14 are welded to one another in a butt joint. The butt joint or respectively the weld seam 14.6 is arranged here in the region of the web-shaped portion 14.3, for example approximately in the middle of the portion 14.3. Alternatively, the butt joint or respectively the weld seam 14.6 could also be arranged in the region of one of the two closed loops, i.e. the portion 14.1, 14.2, which have the function of spacer sleeves. In particular, the weld seam 14.6 can lie in the region of the apex of one of the two loops.

Figure 4:
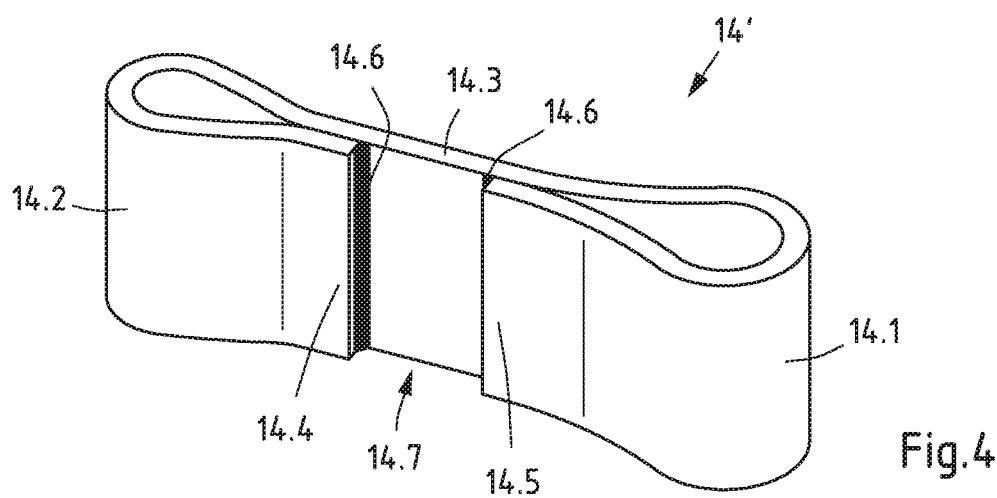

In the example embodiment illustrated in FIG. 4, the two loop ends 14.4, 14.5 of the spacer element 14', produced in a single-shell manner from an individual metal sheet, are at distance from one another and welded in a lap joint to the web-shaped portion 14.3. The loop ends 14.4, 14.5 therefore delimit a recess 14.7 on the web-shaped portion 14.3 of the spacer element 14'. The weld seams 14.6 are preferably embodied as fillet seam weld seams. The portions 14.1, 14.2 of the spacer element (reinforcing element) 14' define, in turn, two closed loops, which have the function of spacer sleeves.

Figure 5:
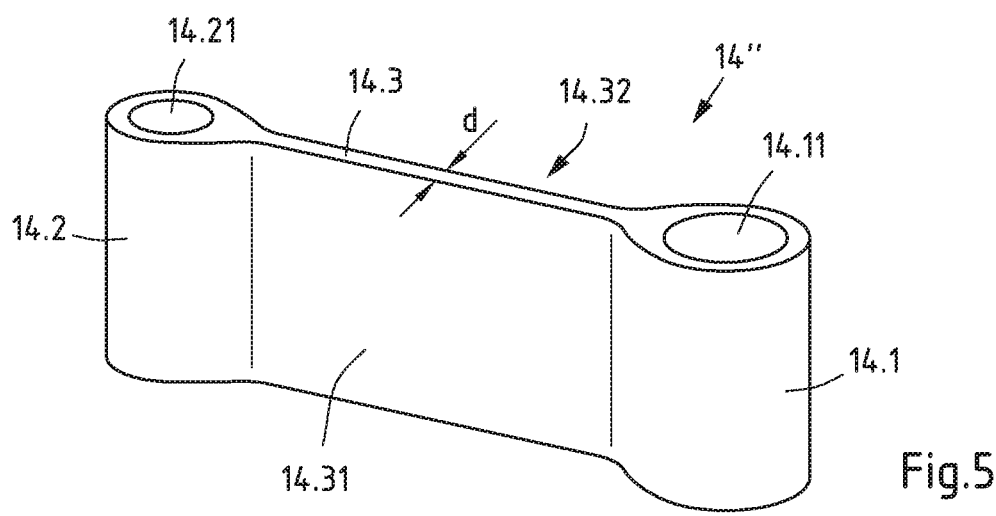

In the example embodiment illustrated in FIG. 5, the spacer element (reinforcing element) 14" is embodied in one piece as a metallic casting or forging. The sleeve-like portions 14.1, 14.2 are therefore connected in one piece with the web-shaped portion 14.3 of the spacer element 14". The portions 14.1, 14.2 have here preferably circular-cylindrical through-holes 14.11, 14.21 for receiving the screws.

The example embodiments of the spacer element 14, 14', 14" illustrated in FIGS. 3 to 5 have in common that the closed loop or respectively the sleeve-like portion 14.2 for receiving a screw of the screwed connection of the cross bridge 20 has a receiving cross-sectional area which is smaller than the receiving cross-sectional area of the loop or respectively of the sleeve-like portion 14.1 of the spacer element, which serves for the inserting of a screw for vehicle body connection. In FIG. 5, the internal diameter of the sleeve-like portion 14.2, which serves for receiving a screw of the screwed connection of the cross bridge 20, is smaller than the internal diameter of the sleeve-like portion 14.1, which serves for receiving a screw for vehicle body connection.

The embodiment of the invention is not limited to the examples illustrated in the drawings. Rather, the invention comprises further embodiment variants, which also make use of the invention, indicated in the enclosed claims, in a configuration deviating from the examples shown. Thus, the spacer element 14, 14', 14" can for example also have at least two sleeve-like portions 14.1 for the inserting of at least two screws for vehicle body connection. Additionally or alternatively, the spacer element 14, 14', 14" can also have at least two sleeve-like portions 14.2 for receiving at least two screws of the screwed connection of the cross bridge 20. The spacer element 14, 14', 14" or respectively its web-shaped portion 14.3, which connects the sleeve-shaped portions 14.1, 14.2 to one another, is then preferably configured so as to be star-shaped.

The invention claimed is:

1. An auxiliary frame for a vehicle comprising:
a first shell element,
a second shell element rigidly connected to the first shell element to define a cavity,
a cross bridge for bearing a vehicle drive unit, wherein the cross bridge is connected by a screwed connection to at least one of the first shell element and/or the second shell element, and
a sleeve-like spacer element for inserting of a screw for vehicle body connection, wherein the spacer element is arranged at one of its ends at a through-hole of the first shell element and extends within the cavity in the direction of a through-hole of the second shell element, and the spacer element has a sleeve-like portion for receiving a screw of the screwed connection of the cross bridge.

2. The auxiliary frame according to claim 1, wherein the shell elements are made from sheet metal.

3. The auxiliary frame according to claim 1, wherein the spacer element has a web-shaped portion, which connects a sleeve-like portion of the spacer element for the inserting of a screw for vehicle body connection to the sleeve-like portion for the receiving of a screw of the screwed connection of the cross bridge, wherein the web-shaped portion is arranged relative to the sleeve-like portions such that the respective sleeve-like portion projects on both sides with respect to the two side faces of the web-shaped portion which run parallel to a screw receiver axis of the respective sleeve-like portion.

4. The auxiliary frame according to claim 3, wherein the web-shaped portion has a thickness, measured perpendicularly to the two side faces, in the range of 3 to 10 mm.

5. The auxiliary frame according to claim 1, wherein the spacer element is configured at least partially in a loop shape.

6. The auxiliary frame according to claim 1, wherein the spacer element is made from a single metal sheet.

7. The auxiliary frame according to claim 5, wherein two loop ends of the spacer element are welded to one another in a butt joint.

8. The auxiliary frame according to claim 5, wherein two loop ends of the spacer element are at a distance from one another and welded in a lap joint to the web-shaped portion.

9. The auxiliary frame according to claim 8, wherein the welded connections at the two loop ends are embodied as fillet seam weld seams.

10. The auxiliary frame according to claim 1, wherein the spacer element is embodied in one piece as at least one of a metallic casting or forging.

11. The auxiliary frame according to claim 1, wherein the spacer element has at least two sleeve-like portions for the inserting of at least two screws for vehicle body connection.

12. The auxiliary frame according to claim 1, wherein the spacer element has at least two sleeve-like portions for the receiving of at least two screws of the screwed connection of the cross bridge.

13. The auxiliary frame according to claim 11, wherein the spacer element is configured so as to be star-shaped.

14. The auxiliary frame according to claim 1, wherein the sleeve-like portion for receiving a screw of the screwed connection of the cross bridge has a receiving cross-sectional area which is smaller than the receiving cross-sectional area of the sleeve-like portion of the spacer element, which serves for the inserting of a screw for vehicle body connection.

15. The auxiliary frame according to claim 1, wherein a shoulder for receiving the spacer element is formed into at least one of the first shell element and/or the second shell element.

16. The auxiliary frame according to claim 1, wherein the shell elements are made from sheet steel.

17. The auxiliary frame according to claim 3, wherein the web-shaped portion has a thickness, measured perpendicularly to the two side faces, in the range of 4 to 8 mm.

18. The auxiliary frame according to claim 1, wherein the spacer element is made from a single steel sheet.

* * * * *